Jan. 8, 1946.   L. M. DAVIS   2,392,651
WORK SUPPORTING AND MOVING MECHANISM
Filed July 11, 1944   4 Sheets-Sheet 1

Jan. 8, 1946. L. M. DAVIS 2,392,651
WORK SUPPORTING AND MOVING MECHANISM
Filed July 11, 1944 4 Sheets-Sheet 2

Inventor
Lee M. Davis

Jan. 8, 1946. L. M. DAVIS 2,392,651
WORK SUPPORTING AND MOVING MECHANISM
Filed July 11, 1944 4 Sheets-Sheet 3
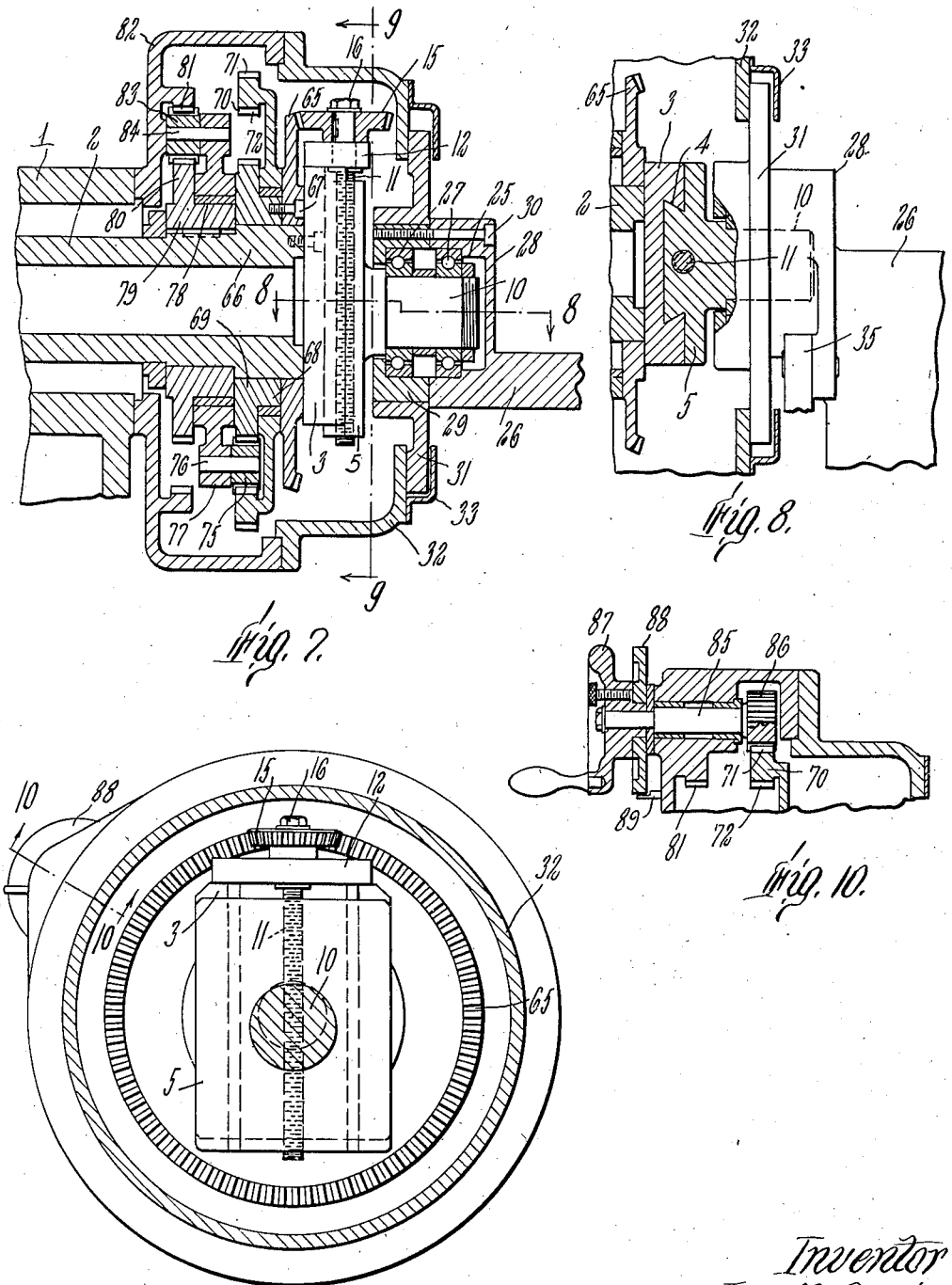

Jan. 8, 1946.                L. M. DAVIS                2,392,651
                WORK SUPPORTING AND MOVING MECHANISM
                    Filed July 11, 1944         4 Sheets-Sheet 4

Inventor
Lee M. Davis
by
Wright, Brown, Quinby & May,
Attys.

Patented Jan. 8, 1946

2,392,651

UNITED STATES PATENT OFFICE 2,392,651

WORK SUPPORTING AND MOVING MECHANISM

Lee M. Davis, Springfield, Vt., assignor to Jones & Lamson Machine Company, Springfield, Vt., a corporation of Vermont Application July 11, 1944, Serial No. 544,418

1 Claim. (Cl. 51—95)

There are many instances where machining of circular surfaces, whether internal or external, is desired, but where the work piece is of such a shape or size, or both, that its rotation about the axis of the surface is not convenient or feasible, and when it is also not desired to move the cutting tool around the periphery of the surface to be worked upon.

An object of the present invention, therefore, is to provide a machine wherein the work piece is given a motion such that the tool may operate properly on the surface but without requiring that the work be rotated about the axis of that surface. Instead, in accordance with this invention, the work is given a gyratory motion about the axis of the circular surface while being held against rotation, and the amplitude of gyration is adjustable in accordance with the diameter of the surface which is being acted upon by the tool and, if desired, to cause the tool to be fed relative to the work. The tool itself, which may be rotary, such as a milling cutter or grinding wheel, may then be merely rotated about its own axis, and either the work or the tool may be moved in the desired relation to the work axis to produce the desired operation on the work.

A further object of the invention is to provide improved means for varying the radius of the orbital path of motion of the work in accordance with the diameter of the work surface and the position of the operating face of the tool, and to produce radial feed between the tool and the work.

Further objects and advantages will appear from a description of an embodiment of the invention shown in the accompanying drawings in which Figure 1 is a fragmentary side elevation of an internal thread grinding machine embodying the invention and showing the work piece in broken lines.

Figure 7 is a detail sectional view on line 7—7 of Figure 2.

Figures 8 and 9 are detail sectional views on lines 8—8 and 9—9, respectively, of Figure 7.

Figure 10 is a detail sectional view on line 10—10 of Figure 9.

Figure 11:
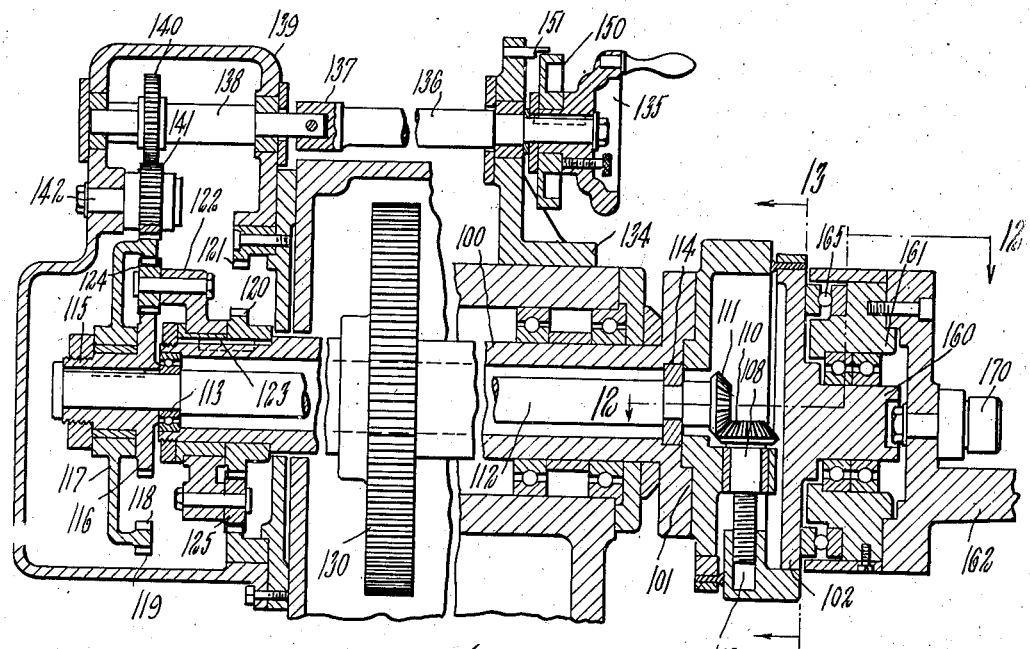

Figure 11 is a central vertical sectional view through the work moving spindle of the upper portion of a machine of a modified construction.

Figure 12:
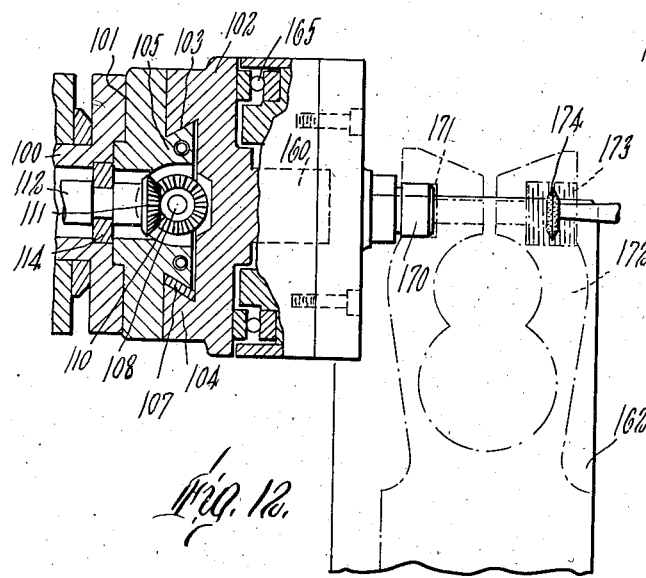
Figure 13:
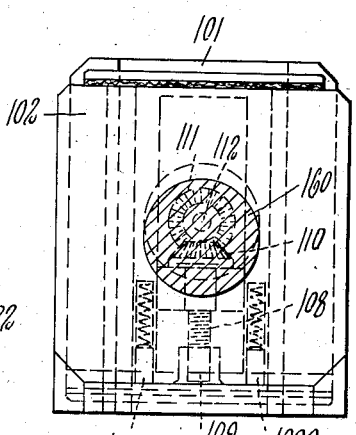

Figures 12 and 13 are detail sectional views on lines 12—12 and 13—13, respectively, of Figure 11.

Referring first to the construction shown in Figures 1 to 4 and 7 to 9, inclusive, at 1 is shown a supporting frame within which is journaled, as shown best in Figure 7, a rotary spindle 2. This spindle is shown as provided at one end with a face plate 3 having as shown best in Figure 8, a dovetail way 4 for the reception of a face member 5 which is slidable laterally of the axis of the spindle. This face member 5 is provided with a journal member 10, which by adjustment of the face member 5, is moved from and toward coaxial relation to the spindle 2. The lateral adjustment of the member 5, as shown, is produced by rotation of a screw 11 threaded through the member 5 and journaled at one end in a bracket 12 projecting forwardly from the face plate 3. This screw 11 may be rotated by the rotation of a beveled gear 15 keyed to its outer end and held in position thereon as by a nut 16 threaded on its outer end. Any suitable means may be provided for rotating the spindle 2. As shown, for example in Figure 1, this spindle may have secured thereto a gear 20. It may be driven by a pinion 21 fixed to a shaft 22 journaled in the frame of the machine and rotated by any suitable means.

The journal portion 10 of the face member 5 has cooperating therewith a journal portion 25 of a work support 26. As herein shown the journal portion 10 is an external journal, while the journal portion 25 is an internal journal, antifriction bearings 27 being positioned therebetween, and also, as shown, the work support 26 may have an outer part 28 within which is positioned the outer of the two bearings 27 and an inner annular portion 29 within which the inner bearing 27 is positioned, the portions 28 and 29 being secured together as by screws 30. The portion 29 may have secured thereto a plate 31 overlying the casing part 32 which houses the members 3 and 5 and certain of their adjusting mechanisms. This plate 31 prevents the entry of foreign matter into the casing 32 while permitting a gyratory motion of the plate 31 relative to the casing, due to the rotation of the journal portion 10 about the axis of the spindle when this journal portion is out of axial alinement therewith.

A guard 33 secured to the casing member 32 and overlying the outer face of the member 31, but with sufficient clearance to permit the gyratory motion of the plate 31, further acts to prevent the entry of foreign material into the casing.

Figure 1:
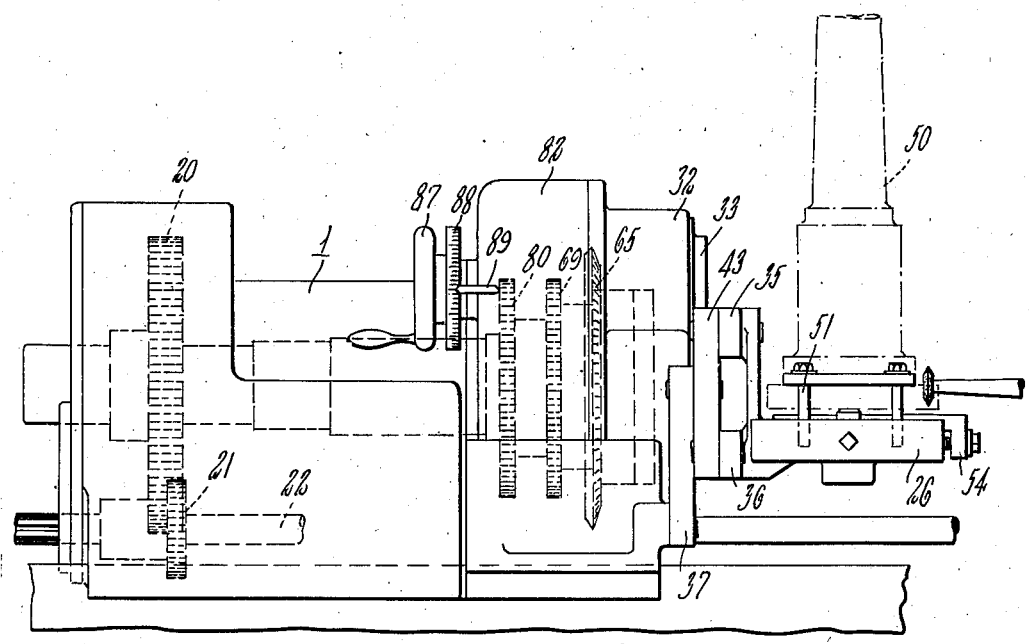
Figure 2:
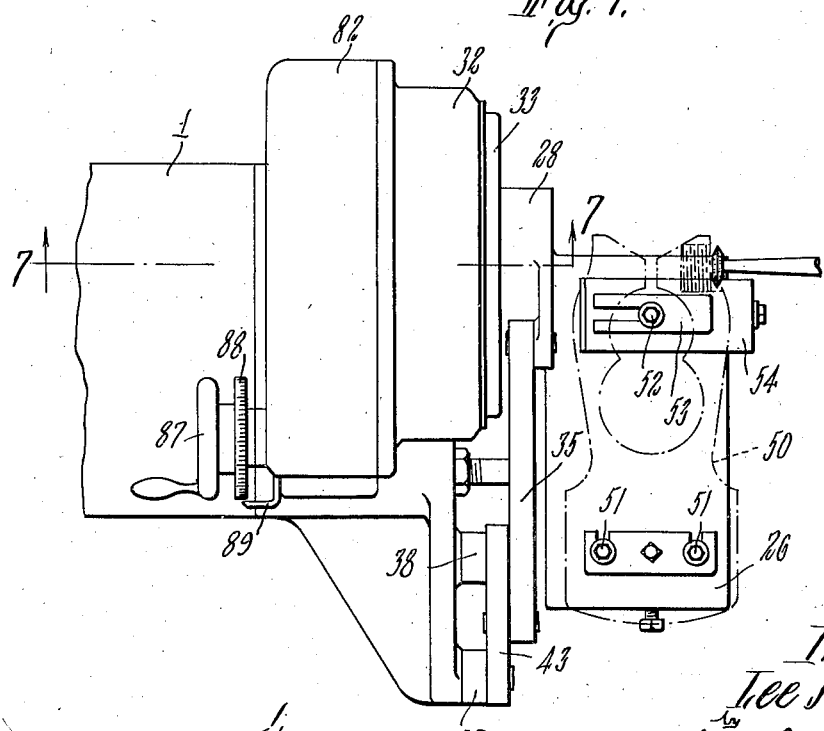
Figure 2 is a fragmentary top plan view of the right hand portion of parts shown in Figure 1.
Figure 3:
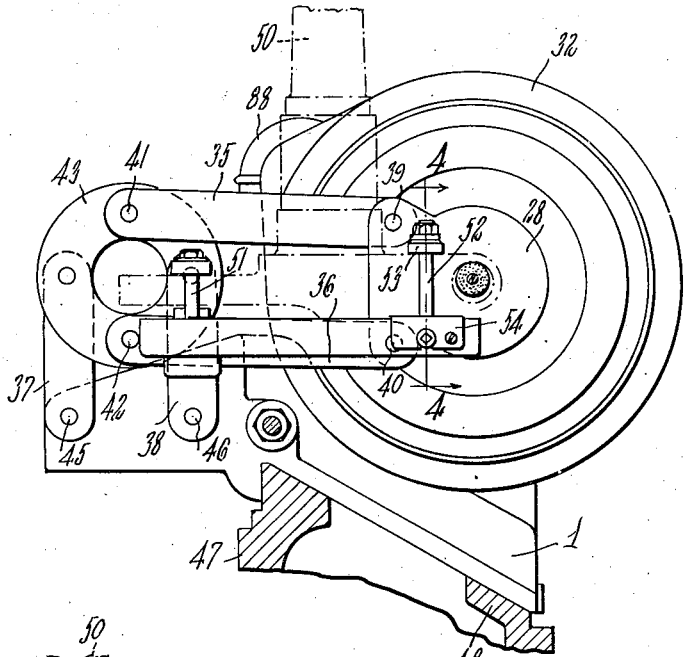
Figure 3 is a right hand end elevation of the parts shown in Figures 1 and 2, the ways for the work support being shown in section.
Figure 4:
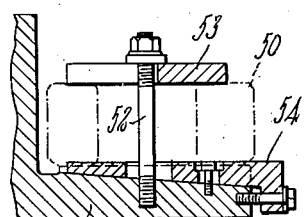
Figure 4 is a detail sectional view on line 4—4 of Figure 3.

The work support 26, while partaking of the bodily rotation or gyratory motion of the journal portion 10, is prevented from rotating therewith. Means for accomplishing this is shown best in Figure 3 and comprises two pairs of links 35, 36 and 37, 38. The links 35 and 36 are pivoted at their inner ends as at 39 and 40 to the work support and at their opposite ends they are pivoted as at 41 and 42 to a floating ring 43. The links 37 and 38 are pivoted at their lower ends on pivots 45 and 46 secured to the support 1, which as shown in Figure 3, may be a work holding carriage movable on ways 47 and 48. The upper ends of the links 45 and 46 are pivoted to the ring 43 on the opposite side of the ring from the links 35 and 36 and at points spaced 90° from the pivots 41 and 42. A piece of work shown in broken lines at 50 in Figure 3 may be clamped to the upper face of the work support as by the studs 51 and 52 and the plates 53 and 54. The pairs of links hold the work support against rotation with the spindle but provide for motion of the work support in a gyratory path about the axis of the work spindle with an amplitude depending upon the amount of eccentricity of the journal portions 10 and 25 with respect to the axis of this spindle. Thus the links 37 and 38 permit a bodily motion of the work support horizontally, while the links 35 and 36 permit such a motion vertically, the two in combination providing for the desired gyratory motion of the work while preventing it from being rotated with the work spindle.

Figure 6:
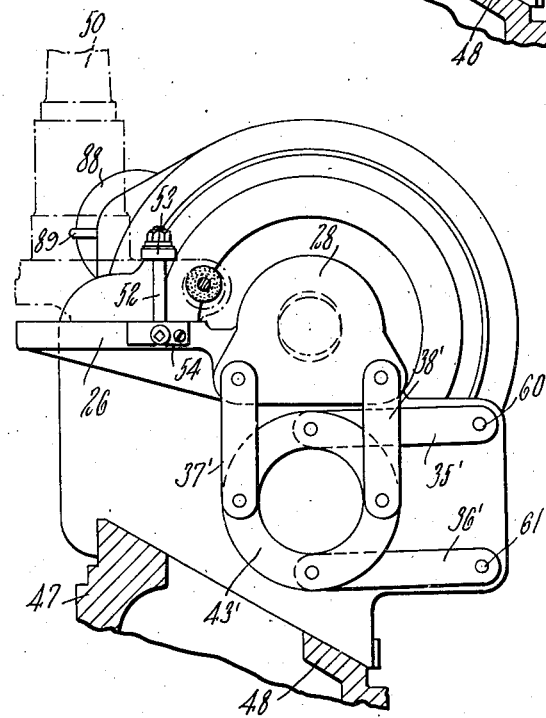
Figures 5 and 6 are fragmentary side and right hand end elevations, respectively, of the work supporting portion of the machine and showing a modified construction.
Figure 5:
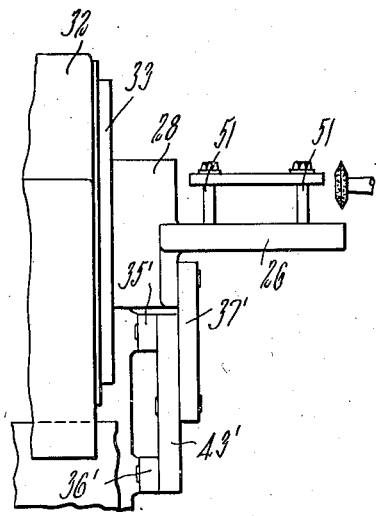

In Figures 5 and 6, a somewhat modified form of linkage is shown for limiting the work support to the desired gyratory motion. In this case the rockable ring 43' to which the pairs of links are pivoted is positioned beneath the axis of the spindle, the horizontal links 35' and 36' being pivoted at their rear ends on the fixed pivots 60 and 61 and at their forward ends to the rim 43', while the vertical links 37' and 38' are pivoted at opposite ends to the floating ring 43' and to the work support. The action, however, is substantially the same as in the construction shown in Figure 3.

Means are provided by which the amount of eccentricity of the journal portions 10 and 25 relative to the spindle may be adjusted and during the rotation of the spindle, but without being affected thereby or partaking of such rotation. To this end in Figure 7 the pinion 15 is shown as meshing with a beveled gear ring 65 journaled on an enlarged diameter portion 66 of the spindle 2 and secured as by screws 67 to the hub 68 of an external gear 69 also journaled on the spindle portion 66. Journaled on a bushing on the hub portion 68 of the gear 69 is a ring 70 having integral therewith an external gear 71 and an internal gear 72, the internal gear 72 at least being arranged in the same plane with the gear 69. Meshing with the internal gear 72 and the external gear 69 are pinions 75 journaled on shafts 76, projecting from a ring 77. This ring 77 is journaled on a bushing 78 on the hub 79 of an external gear 80, this gear being the same diameter as the gear 69 and keyed to the spindle 2. In the same plane with the gear 80 is an internal gear 81 integral with or fixed to a casing portion 82, this internal gear thus being stationary, and being of the same diameter as the internal gear 72. Between the internal gear 81 and the external gear 80 are pinions 83 journaled on pins 84 also carried by the ring 77. With this arrangement of the parts, rotation of the spindle 2, causing rotation of the gear 80, produces a planetary motion of the pinions 83 about the interior of the fixed internal gear 81 and thus produces a rotation of the disk 77. This rotation of the disk 77 carries around with it the pinions 75, which, assuming that the ring 70 is stationary, cause rotation of the gear 69, but this rotation is at the same speed and direction as that of the spindle, this being due to the equal diameters of the internal gears 81 and 72 and the equal diameters of the external gears 80 and 69. The bevel gears 65 and 15 are thus rotated as a unit with the face plate 3 at the same speed, so that the gear 15 remains stationary about its own axis. If now, the ring 70 be rotated, as by rotation of a shaft 85 (see Figure 10) carrying a pinion 86 meshing with the external gear portion 71 of the ring 70, the pinions 75 are driven at a rate different from the rate of drive of the pinions 83 so that a rotation of the gear 65 relative to the rotation of the spindle 2 is produced, this acting to rotate the bevel gear 65 about its own axis, thus to turn the screw 11 and change the eccentricity of the journal portions 10 and 25 relative to the spindle, thus to change the radius of gyration of the work support. As shown in Figure 10, the shaft 85 is journaled in the casing portion 82 and carries a hand wheel 87 at its outer end. A disk 88 also carried by the hand wheel may have cooperating therewith an index pointer 89 which will serve to show to the operator the position of angular adjustment of the shaft 85 and thereby indicate the amount of eccentricity and therefore the amplitude of gyration of the work support.

In some cases it may be desirable that the adjustment of the eccentricity be located at some distance from the casing 82. Such an arrangement is shown in Figures 11 to 13 and which also shows a modified form of planetary gearing for adjustment purposes. Referring to Figure 11, the work spindle 100 is shown as hollow and carries at its forward end the face plate 101 carrying a face member 102 having dovetailed guides 103 and 104 engaging a dovetail 105 of the face plate 101. A gib 107 may be employed to take up wear between these parts. The face plate 101 may have journaled therein a radially extending threaded shaft 108, the threaded portion engaging in a threaded socket 109 in the face member 102, spring pressed plugs 1090 (Figure 13) taking up any lost motion in the threads. A beveled pinion 110 on this shaft 108 meshes with a similar pinion 111 on a shaft 112 arranged coaxially with the spindle and extending therethrough and journaled therein in the bearings 113 and 114. On the rear end of the shaft 112 beyond the end of the spindle 100, the shaft 112 has keyed thereto the hub 115 of an external gear 116. Journaled on this hub is a ring member 117 having an internal gear 118 and an external gear 119, both in the same plane with the gear 116. An external gear 120 of the same external diameter as the gear 116 is keyed to the spindle 100 and in the same plane therewith is an internal gear 121 of the same diameter as the internal gear 118. A ring member 122 is journaled on a bushing 123 keyed to the spindle 100 and carries journaled thereon two sets of pinions 124 and 125. The pinions 124 engage between the internal gear 118 and the external gear 116, and the pinions 125 engage between the internal gear 121 and the external gear 120. If now the ring member 117 be held stationary and the spindle 100 be rotated, as by driving the gear 130 fixed thereto, rotation of the gear 120 with the spindle rotates the pinions 125 which roll around in contact with the stationary internal gear 121 and cause a rotation of the ring member 112. This, in turn, carrying the gears 124, causes these gears to be rotated around the internal gear 118 and this causes rotation of the gear 116 at the same rate and direction as the spindle. Thus there is no relative rotation between the shaft 112 and the spindle 100, so that the bevel gear 111 is rotated at the same rate as the gear 110 is carried around it, so that the screw shaft 108 is held against rotation. If now the ring 117 be rotated, as through driving engagement with the external gear portion 119, this stationary condition is upset and the shaft 112 is rotated at a different rate from the spindle, either faster or slower, with corresponding rotation of the screw shaft 110 in one or the other direction to adjust the face member 102 laterally of the spindle, thus to change the radius of orbital motion of the work holder. This rotation of the ring member 117 to adjust the radius of orbital motion may be effected by rotation of a hand wheel 135 carried by a shaft 136 journaled in a bracket 134 secured to the machine head, this shaft 136 being connected through a pin coupling at 137 with a shaft 138 journaled in the casing member 139. This shaft 138 carries a gear 140 which meshes with a gear 141 journaled on a stub shaft 142 carried by the casing 139, this gear 141 meshing with the external gear 119. An indicator disk 150 carried by the hub of the hand wheel 135 cooperating with a fixed pointer 151 may be employed to indicate to the operator the condition of adjustment of the orbital path radius for the work support.

The face member 102 is provided with the journal portion 160 with which cooperates the journal portion 161 carried by the work support 162, which is held against rotation with the journal portion 160, as for example, by the link connections shown in Figures 1 to 3, or 5 and 6. A thread bearing 165 may be interposed between the journal portion 161 and the outer face of the member 102. The work support may be provided with a work centering plug 170 arranged coaxial with the journal member 160 for engagement in a hole 171 (Figure 12) in a work piece 172 carried on the work support and having a hole 173 coaxial with the hole 171 in which it may be desired to grind threads as by the thread grinding wheel 174.

From the foregoing description of certain embodiments of this invention, it will be understood that various further changes and modifications might be made without departing from the spirit or scope of this invention.

I claim:

In combination, a rotary spindle, means for rotating said spindle, a face plate secured to one end of said spindle, a member carried by said face plate and movable transverse to the axis of said spindle, a gear fixed to said spindle, a ring journaled to rotate coaxially with said fixed gear, a stationary internal gear of greater diameter than said fixed gear, pinions rotatably carried by said disk and meshing with said internal gear and said fixed gear whereby rotation of said spindle will rotate said ring, a journaled external gear the same diameter as said fixed gear, an internal gear of the same diameter as said stationary internal gear and journaled for rotation relative to said spindle, pinions carried by said disk meshing with said journaled external gear and said journaled internal gear, whereby said journaled external gear rotates with said spindle when said journaled internal gear is stationary, means actuated by relative motion of said journaled external gear and said spindle and connected to said member for adjusting said member transversely of said spindle, and means for turning said journaled internal gear to thereby produce said relative motion between said journaled external gear and said spindle.

LEE M. DAVIS.